United States Patent [19]
McElroy

[11] 3,770,233
[45] Nov. 6, 1973

[54] CABLE DRAW MECHANISM

[76] Inventor: James A. McElroy, Box 232, Babcock Blvd., Rt. No. 4, Gibsonia, Pa.

[22] Filed: Jan. 13, 1971

[21] Appl. No.: 106,177

Related U.S. Application Data

[63] Continuation-in-part of Ser. No. 6,200, Jan. 27, 1970, Pat. No. 3,637,175.

[52] U.S. Cl. .............................. 248/55, 248/68 R
[51] Int. Cl. ............................................ B65h 51/22
[58] Field of Search ............... 248/55, 68; 104/189, 104/191

[56] References Cited
UNITED STATES PATENTS

| | | | |
|---|---|---|---|
| 3,602,467 | 8/1971 | Thomas | 248/55 |
| 3,426,988 | 2/1969 | Bradley | 248/55 |
| 387,995 | 8/1888 | Pendelton | 104/191 |
| 2,103,811 | 12/1937 | Davis | 248/55 |

FOREIGN PATENTS OR APPLICATIONS

| 1,078,001 | 8/1967 | Great Britain | 248/55 |
|---|---|---|---|

Primary Examiner—Roy D. Frazier
Assistant Examiner—Rodney H. Bonck
Attorney—Buell, Blenko & Ziesenheim

[57] ABSTRACT

A cable draw mechanism is provided for use in cable trays having spaced side rails and transverse rungs comprising an elongated base member extending from beneath one of said spaced side rails to the other between said rungs, a pair of vertical standards on the base member, a shaft between said vertical standards generally parallel to said base, a plurality of side by side rollers on said shaft and fastening means on the base engaging one of said rungs and said side rails to hold the base in place between said rails.

3 Claims, 3 Drawing Figures

PATENTED NOV 6 1973
3,770,233
Fig. 1.
Fig. 2.
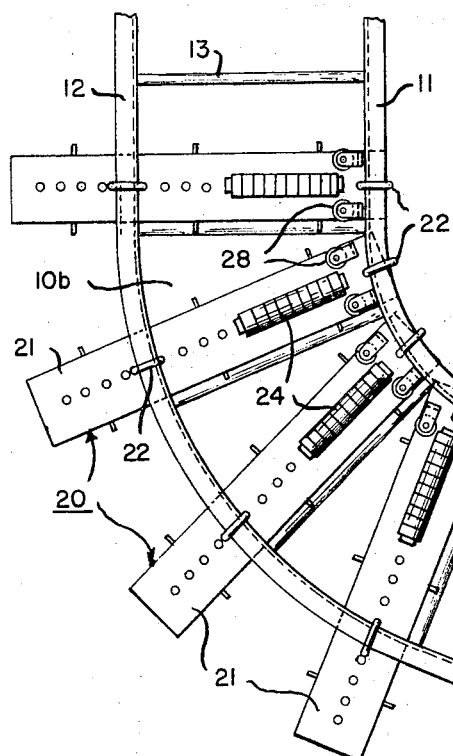
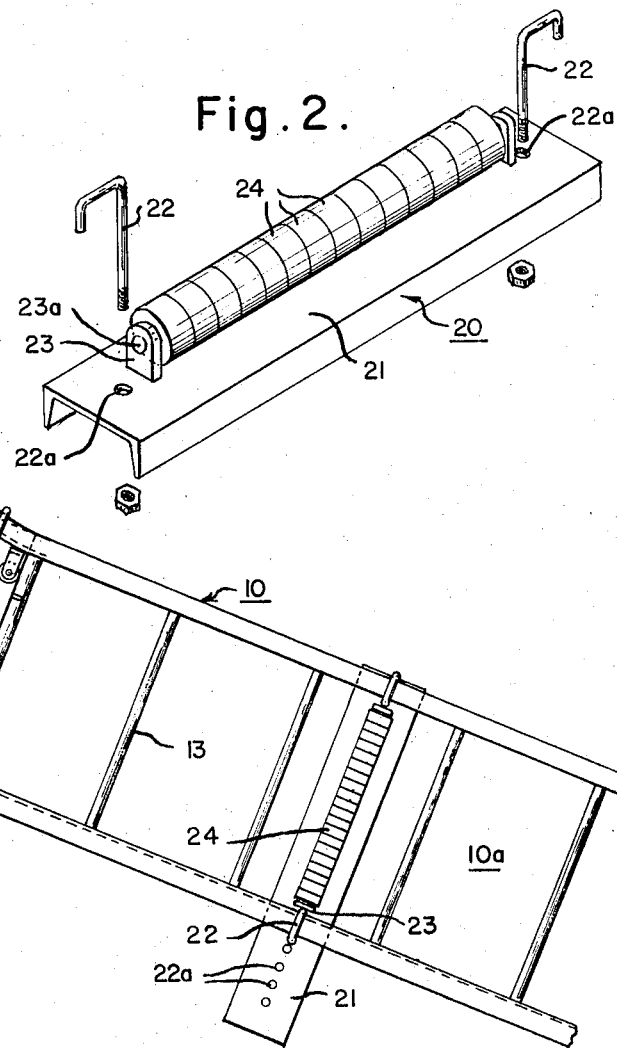
Fig. 3.
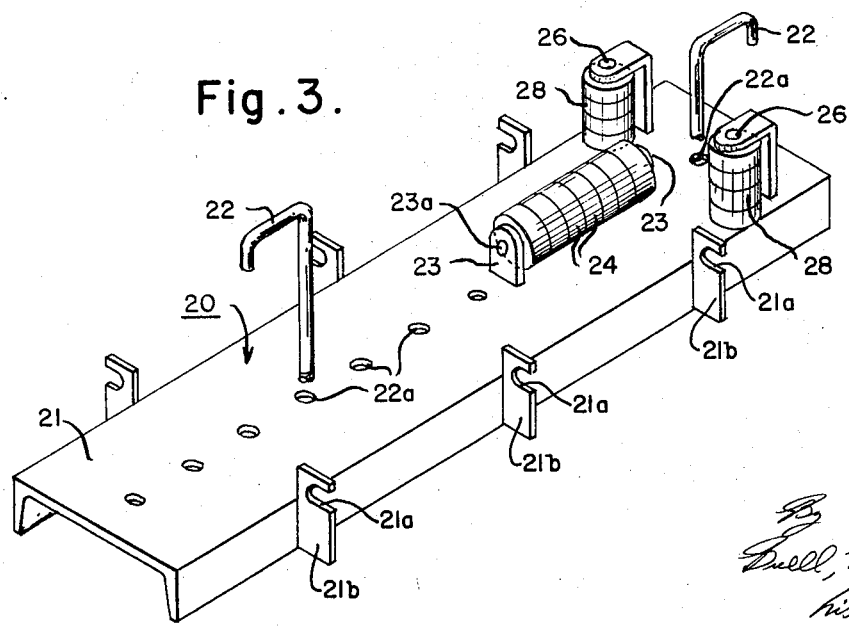
INVENTOR
James A. McElroy
his attorneys

CABLE DRAW MECHANISM

This application is a continuation-in-part of my co-pending application Ser. No. 6200, filed Jan. 27, 1970, now U.S. Pat. No. 3,637,175.

The present invention relates to cable draw mechanisms and particularly to a cable draw mechanism for cable trays, useful in drawing heavy electrical cables of various size on supports therefor which are generally called cable trays. More particularly the invention relates to a draw mechanism for cable trays which permits heavy cable to be drawn in the plane of the tray bottom and which eliminates the problem of interference from cables which have been previously drawn and friction from the tray itself.

Cable trays are widely used in supporting industrial electric cables in construction projects. Such electrical cables are of considerable diameter, in many cases five or six inches or more. In a typical installation a number of electrical cables are laid side by side in the cable tray and are drawn one at a time through the whole tray system around bends as required. These cables are exceedingly difficult to handle because of their large size and frequently great length. The friction of the cable in the tray as well as the bending problem of the cable itself in going around corners is a tremendous problem in the drawing of the cables through the tray. In laying the cables each cable is drawn completely through the cable tray from one end to the other before the next or succeeding cable is similarly drawn or handled. The length of the cable trays presently used may be measured in hundreds or even thousands of feet. The frictional forces which are developed in drawing the cable through such an elongated system of trays becomes extremely large, and entails inordinate amounts of hand labor. The drawing forces which are required are increased further by various types of fittings such as horizontal curved risers, elbows of differing radii, tees, wyes, crosses, reducers and other accessories which find frequent use in a typical installation.

Cable trays as normally used are in the form of a rung or ladder construction of low profile channel in a variety of widths. In conventional practice, drawing of the electrical cables is facilitated to some extent by the use of solid elongated rollers mounted between adjacent rungs of the cable tray and extending entirely across the space between the side rails of the tray. The cables are then successively laid by drawing them one by one across the rollers through the tray which rollers are usually spaced about a dozen feet or so along the length of the tray. These rollers, however, do not solve the problem and a very serious difficulty arises in that after one or two of the cables are laid in the tray the conventional rollers cease to turn, owing to their frictional engagement with previously laid cables, as the next succeeding cable is being pulled. After the cable tray has been fully loaded, it is difficult to remove these rollers which frequently are damaged in the removal operation. Because of their size and particularly their length, these conventional rollers are difficult to manufacture and to store properly, and this problem is complicated by the large number of rollers which are required in this prior art type of practice. Various other combinations of rollers and pulleys have been utilized, incorporating complex clamping or gripping arrangements to hold them in position relative to the cable tray. However, these prior practices have been cumbersome, inconvenient, and inefficient in application, and have not met with success. Typical of the fixed rollers or pulleys which have been proposed in the prior art in an attempt to solve some of the problems which are mentioned above, are those disclosed in U.S. Pat. to Bradley at al No. 3,426,988. This patent discloses an array of pulleys which are secured in tandem across the width of the cable tray. This arrangement is an improvement over the practices which are outlined above using a continuous roller. However, the Bradley type device, while solving a portion of the problem, fails to solve all of the problem. For example, a large expenditure of time is required in securing and removing the individual rollers from the cable tray. Although the Bradley rollers are secured from the side of the cable tray opposite from the cables laid therein, the rollers must be removed from the open side of the tray by spreading or lifting or otherwise rearranging the heavy cables, and this must be done at each point where a set of rollers is installed. This takes a considerable period of time and is less than satisfactory.

There are other cable conduit drawing aids which have been used in the past, but these also fail to show a satisfactory solution to the problem. For example, U.S. Pats. to Tyler No. 1,097,273 and Kearney No. 1,766,254 show different attempts to solve the problem. In Tyler, supports are provided which are useful for laying closely spaced pipes, conduits and the like. They are, however, not appropriate for electrical cables and they involve considerable difficulty in removing them from beneath the cable. The Kearney patent shows a multiple place cable rack for adjustably supporting one or more cables in a vertical array. Here again, however, the structure is inappropriate for large electrical cables or for use with a cable tray, and extreme difficulty would be experienced in attempting to use and remove the Kearney apparatus from a tray.

The present invention overcomes the difficulties of the prior art, with the provision of a cable draw mechanism which can be mounted on and readily removed from a typical cable tray structure whether it be of the ladder type or of the other types of structures such as shown in U.S. Pat. No. 3,137,468. The structure provides quick means for attaching, and for bearing the pull so that it is employed as a part of the cable draw mechanism with minimal expenditure of time and labor.

Preferably, I provide in a cable draw mechanism for use in cable trays having a pair of spaced apart side rails and transverse rungs, an elongated base member extending from beneath one rail to the other between said rungs, a pair of vertical standards, generally parallel to said base, a plurality of side by side spaced apart rollers on said shaft and fastening means on the base engaging one of the side rails and rungs. Each set of rollers on a shaft is made up of a plurality of individual rollers which are independently movable so that there is no tie between the rollers and they can rotate independently. Each roller is relatively narrow so that no two cables can bear on it simultaneously. The fastening means is preferably a J-shaped bolt which engages over the side rails at each side of the tray. Preferably a vertical post is provided on the base carrying a plurality of side by side rollers where the mechanism is used in a curved tray. A cable is drawn across the rollers bearing on both the two transverse sets of roller members so that the cable bears always on a rolling member.

In the foregoing general discussion, various objects, features, and advantages of the invention have been set forth. Other objects, features, and advantages of the invention will be more fully understood by reference to the following description and the accompanying drawings in which:

FIG. 1 is a top plan view of a section of cable tray illustrating a preferred form of my draw mechanism secured therein in the horizontal plane;

FIG. 2 is an enlarged isometric view of a single cable draw mechanism alone; and FIG. 3 is an enlarged isometric view of a single cable draw mechanism adapted for use in curved trays.

Referring more particularly to the drawings and to the form of draw mechanism there illustrated, I have shown a conventional form of cable tray 10 having a straight section 10a and a curved portion 10b made up of one side rail member 11 and a second spaced side rail member 12 separated by rungs 13. The draw mechanism 20 is made up of a base plate in the form of channel 21 adapted to extend beneath the two side rails 11 and 12 and be held in place by J bolts 22 which extend upwardly through holes 22a in the base and over the side rails. Two vertical members 23 extend vertically upwardly from the base and are provided with a shaft 23a which extends between the two members. Each of the shafts 23a is provided with a plurality of side by side independently rotating rollers 24. Extending vertically above the base member 21 of the draw mechanism are shafts 26 which are transverse to the shafts 23a. The shafts 26 carry a plurality of side by side rollers 28 which are independently rotatable. The draw mechanism 10 is used in the following manner.

The assembly is placed on the cable tray with the J bolt engaging the side rails of the tray and the base bearing against the side rails 11 and 12 of the cable tray and the slots 21a of vertical posts 21b engaged around the adjacent rung of the tray. The cable to be drawn is then passed over the rollers 24 and against the rollers 28 as can be clearly seen in FIG. 1. The cable is then drawn through the entire system using a draw mechanism according to this invention at spaced points in the system. When the cable has been drawn, the J bolts are released from the side rails and the mechanism removed from the bottom of the tray.

Obviously the diameter of the various rollers and the spacing of the separate draw members can be varied to suit the particular set of cable trays which are being used and to the particular cables which are being drawn.

From the foregoing description it is obvious that the draw mechanism of the present invention eliminates the problem of friction in the tray and at each curve in the cable tray and permits the cable to be drawn through the tray with much greater ease and with much less labor than heretofore possible. Each of the independently rotatable rollers acts without interference from the next adjacent roller so that friction of the cable on the roller is much reduced and the mechanism can operate easily.

It will be understood that this invention may take various forms and embodiments and that it may be otherwise embodied and practiced within the spirit and scope of the following claims.

I claim:

1. In a cable draw mechanism a cable tray having spaced side rails and spaced transverse rungs connecting said rails, an elongated base member extending beneath the side rails parallel to and between adjacent rungs, a shaft mounted on said base member extending parallel thereto above said base, a plurality of side by side independently rotatable rollers on said shaft, first fastening means on said base member engaging one of said rungs and second fastening means on said base member engaging each of said side rails to hold the base in place between said rails.

2. A cable draw mechanism for cable trays as claimed in claim 1 wherein said fastening means is a J bolt.

3. A cable draw mechanism for cable trays as claimed in claim 1 wherein a vertical standard extends from the base member at one end and carries a plurality of independently rotatable rollers thereon.

* * * * *